United States Patent
Louvau et al.

(10) Patent No.: US 9,430,528 B2
(45) Date of Patent: *Aug. 30, 2016

(54) GRID QUERIES

(71) Applicant: Microsoft Technology Licensing, LLC, Redmond, WA (US)

(72) Inventors: Scott M. Louvau, Redmond, WA (US); Michael C. Fanning, Redmond, WA (US); Christopher M. Faucon, Bellevue, WA (US)

(73) Assignee: Microsoft Technologies Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/852,687

(22) Filed: Sep. 14, 2015

(65) Prior Publication Data

US 2015/0379084 A1    Dec. 31, 2015

Related U.S. Application Data

(63) Continuation of application No. 13/909,079, filed on Jun. 4, 2013, now Pat. No. 9,158,809.

(51) Int. Cl.
    *G06F 17/30*    (2006.01)
(52) U.S. Cl.
    CPC ... *G06F 17/30483* (2013.01); *G06F 17/30345* (2013.01); *G06F 17/30424* (2013.01); *G06F 17/30477* (2013.01)
(58) Field of Classification Search
    CPC .................. G06F 17/30424; G06F 17/30477; G06F 17/30345; G06F 17/30483
    See application file for complete search history.

(56) References Cited

U.S. PATENT DOCUMENTS

| | | |
|---|---|---|
| 5,826,257 A | 10/1998 | Snelling, Jr. |
| 6,052,121 A | 4/2000 | Webster et al. |
| 6,338,056 B1 | 1/2002 | Dessloch et al. |
| 6,496,819 B1 | 12/2002 | Bello et al. |
| 6,990,238 B1 | 1/2006 | Saffer et al. |
| 7,702,625 B2 | 4/2010 | Peterson et al. |
| 7,860,891 B2 | 12/2010 | Adler et al. |
| 7,966,301 B2 | 6/2011 | Toyama et al. |
| 8,190,992 B2 | 5/2012 | Tien et al. |
| 8,229,730 B2 | 7/2012 | Van Den Berg et al. |
| 2006/0074934 A1 | 4/2006 | Dettinger et al. |
| 2006/0155689 A1 | 7/2006 | Blakeley et al. |
| 2011/0252073 A1 | 10/2011 | Pauly |

OTHER PUBLICATIONS

"Non-Final Office Action Received for U.S. Appl. No. 13/909,079", Mailed Date: Feb. 24, 2015, 11 Pages.
"Notice of Allowance Issued in U.S. Appl. No. 13/909,079", Mailed Date: Jun. 8, 2015, 7 Pages.

(Continued)

*Primary Examiner* — Jorge A Casanova
(74) *Attorney, Agent, or Firm* — Kevin Sullivan; Kate Drakos; Micky Minhas (57) ABSTRACT

Aspects of the subject matter described herein relate to grid queries. In aspects, a client sends search criteria that represent two or more dimensions to a service. The service obtains results that satisfy the search criteria and performs intersection operations to populate a data grid. The data grid is then returned to the client for output on an output device of the client. The client may provide a user interface that allows quick updating of the search criteria to obtain a new data grid.

20 Claims, 6 Drawing Sheets

(56) References Cited

OTHER PUBLICATIONS

Eick, Stephen G., "Visualizing Multi-Dimensional Data", In Newsletter of ACM SIGGRAPH Computer Graphic, vol. 34, Issue 1, Feb. 1, 2000, pp. 61-67.

Wu, et al., "FastBit: Interactively Searching Massive Data", In the Journal of Physics: Conference Series, vol. 180, Issue 1, Jun. 2009, 12 Pages.

"Response Filed to Non-Final Office Action in U.S. Appl. No. 13/909,079", Filed Date: May 21, 2015, 9 Pages.

| v:latest | cat: education | cat: entertainment | cat:games |
|---|---|---|---|
| size:10kb | 9.7% | 7.5% | 8.8% |
| size:100kb | 50.5% | 52.8% | 32.2% |
| size:1mb | 29.7% | 33.4% | 41.1% |
| size:10mb | 8.6% | 5.9% | 16.4% |
| size:100mb | 1.4% | 0.4% | 1.5% |
| size:1gb | 0.0% | 0.0% | 0.0% |
| Total | 8891 | 7547 | 7283 |

GRID QUERIES

CROSS-REFERENCE TO RELATED APPLICATIONS

This application claims priority to and is a continuation of co-pending U.S. patent application Ser. No. 13/909,079 entitled "Grid Queries" and filed Jun. 4, 2013, which is incorporated herein by reference.

BACKGROUND

Businesses and other organizations accumulate and maintain a vast amount of data. Obtaining useful information from this data often requires creating and executing multiple queries by database administrators or custom programming by skilled database developers. With the former, when other data is desired, new queries may need to be created and executed. With the latter, the result is a fragile product that is suitable for obtaining the information for which it was developed but that is often not suitable for obtaining other information from the data without additional costly and time-consuming development.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to grid queries. In aspects, a client sends search criteria that represent two or more dimensions to a service. The service obtains results that satisfy the search criteria and performs intersection operations to populate a data structure. The data structure is then returned to the client for output on an output device of the client. The client may provide a user interface that allows quick updating of the search criteria to obtain a new data grid.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
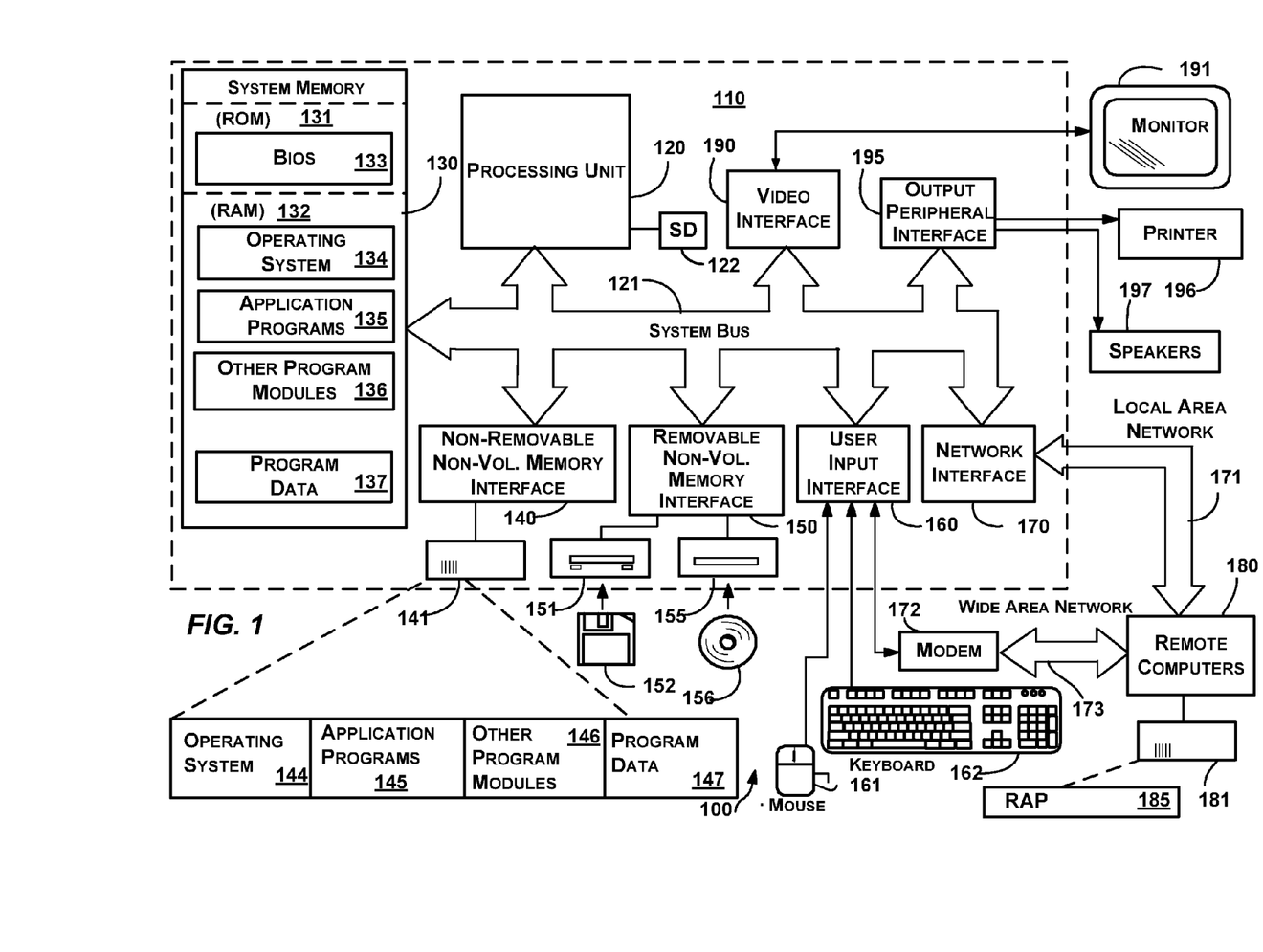
FIG. 1 is a block diagram representing an exemplary computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like. While various embodiments may be limited to one or more of the above devices, the term computer is intended to cover the devices above unless otherwise indicated.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and one or more system buses (represented by system bus 121) that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Computer storage media does not include communication media.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM, DVD, or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 120 through a user input interface 160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include phone networks, near field networks, and other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Data Grid

Figure 2:
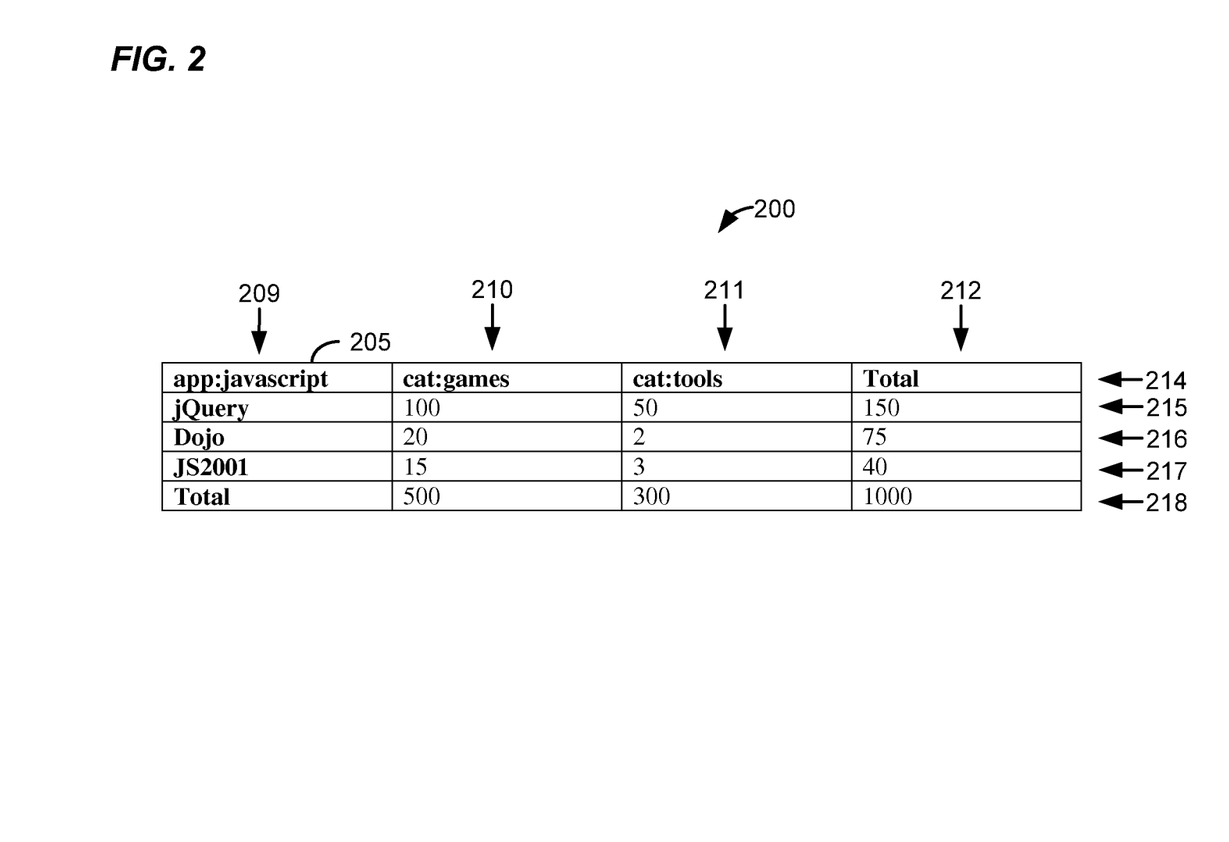
FIGS. 2-3 generally represent exemplary data grids in accordance with aspects of the subject matter described herein.
Figure 3:
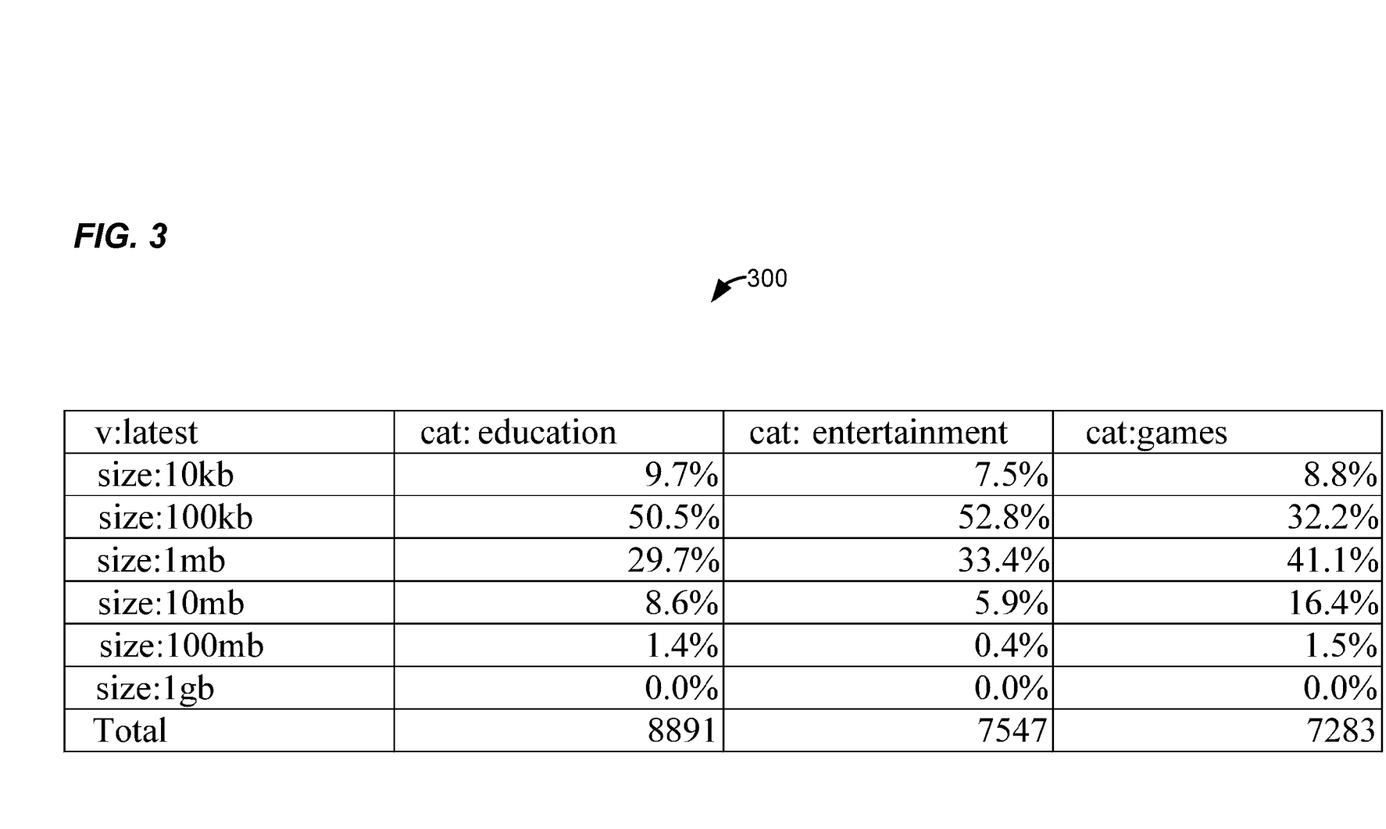

As mentioned previously, obtaining useful data from a company's data is often challenging and tedious. FIGS. 2-3 generally represent exemplary data grids in accordance with aspects of the subject matter described herein. Turning to FIG. 2, the data grid 200 illustrates exemplary results obtained from a base query 205, two column queries, and three row queries.

As illustrated, the data grid 200 includes columns 209-212 and rows 214-218. The header row includes an indication of the terms that are used for the base query 205 and the column queries 210-211. The left column 209 includes an indication of terms that are used for the row queries. The data cells of the data grid 200 include the cells at the intersections of the columns 210-212 and the rows 215-217. The data cells include a count of data items that match the intersection of the base query, an appropriate row query, and an appropriate column query as described in more detail below.

Queries may be used to search data to obtain results that match the queries. Search data may be extracted from the content and/or metadata of documents (sometimes referred to herein as data items). Content is data that is included in the document itself; metadata is data about the document. As described herein, a document includes a collection of data. Documents may be structured for a particular type of program. For example, a document may include word processing data, spreadsheet data, presentation data, a Web page, source code for a program, a database, an image, a uniform resource locator (URL), and the like. A document may follow a specified syntax or may include text that does not follow a specified syntax.

In describing aspects of the subject matter herein, a query term may be shown as including a ":". In one implementation, when a query term includes a ":", the query may be interpreted to be a query that involves metadata of documents. In another implementation, when a query includes a ":", the query may be interpreted to be a query that restricts searching of the term to a specified location that may be in the metadata and/or the content of documents. For example, a query starting with "f:" may instruct a search engine to restrict searching to function names of code documents. If the query term does not include a ":", the query may be interpreted to be a query that is not restricted to a specified location and that may be satisfied by searching metadata and contents of documents.

For example, the term "app:javascript" may be used to instruct a search engine to search for applications that have been indicated (e.g., via metadata) as including javascript. Likewise, the terms "cat:games" and "cat:tools" may be used to instruct a search engine to search for applications that have been classified in the categories of games and tools, respectively. A document is not restricted to being associated with a single metadata search term. For example, a document that is associated with "cat:games" may also be associated with "cat:education".

On the other hand, the terms "jQuery" and "Dojo" do not include a ":" and may be used to instruct a search engine to search for documents that include content and/or metadata that matches these terms.

The mechanism described above for classifying a search term as a search on metadata or a search on content is exemplary only. In other implementations, other mechanisms may be used for explicitly or implicitly indicating what data is to be searched for a term without departing from the spirit or scope of aspects of the subject matter described herein.

In one implementation, search data may be stored in an inverted index data structure. In an inverted index data structure, each search term is associated with one or more documents that include the search term or that are associated with metadata that includes the search term. For example, the table below shows an exemplary inverted word index that includes some terms and associated document identifiers.

| Term | Document Identifiers |
|---|---|
| app:javascript | 1, 3, 7, 15, . . . |
| jQuery | 2, 7, 36, 39, . . . |
| DoJo | 7, 15, 23, 31, . . . |
| JS2001 | 8, 15, 17, 54, . . . |
| . . . | . . . |

The inverted index data structure above may include a term for each different term that is searchable for a given set of documents. For example, there may be N terms extracted from the contents of documents and M metadata terms associated with the documents. In this example, the inverted index data structure may include N+M entries where each entry is associated with its own set of document identifiers.

In other implementations, search data may be stored in other data structures. Some exemplary data structures include a relational database, an object-oriented database, a hierarchical database, a network databases, another types of databases, some combination or extension of the above, and the like. Data stored in a database may be organized in tables, records, objects, other data structures, and the like. The data stored in a database may be stored in dedicated database files, dedicated hard drive partitions, HTML files, XML files, spreadsheets, flat files, document files, configuration files, other files, and the like. Search data may be stored in local storage, cloud storage, or a combination thereof.

Search criteria for a data grid may be specified by a base query, one or more column queries, and one or more row queries. In one implementation, each of the base query, the one or more column queries, and the one or more row queries is optional.

A base query includes data that identifies a set of data items. For example, the base query 205 includes data (e.g., app:javascript) that identifies applications that are written in JavaScript. One purpose of a base query is to limit a result set to the set of data items identified by the base query.

A column query and row query are similar to the base query in that they also include data that identifies a set of data items. As illustrated in FIG. 2, there are two column queries and three row queries.

Although both of the column queries are illustrated as being of a category type, the column queries are not required to be of the same type. For example, one column query may include a category type (e.g., cat:games), another column query may include text found within documents (e.g., ToDo), another column query may include a publisher's name, and so forth. This is also true for row queries.

A query may include one or more terms and zero or more operations (e.g., AND, NOT, OR, NEAR, and so forth). An operation may be implied or explicitly indicated.

As described herein, data grids are often described in two dimensions (e.g., a row dimension and a column dimension). It is to be understood, however, that the teachings herein may also be applied to additional dimensions. For example, an "over time" dimension may be added to show how values in grids have changed over time. As another example, a "version" dimension may be added to show how values in grids change with versions. The examples of additional dimensions described above are not intended to be all-inclusive or exhaustive. Based on the teachings herein, those skilled in the art may recognize other dimensions that may be added without departing from the spirit or scope of aspects of the subject matter described herein.

The data in the cells of the data grid 200 may be determined by intersection operations on sets of document identifiers identified from the queries. For example, the 100 found in the intersection of row 215 and column 210 may be found by intersecting document identifiers found for app:javascript with document identifiers found for jQuery and document identifiers found for cat:games. The result of 100 indicates the number of documents that satisfy this intersection operation. Likewise, the numbers found in the other cells may be determined in a like manner by performing intersection operations on the result sets from the base query and appropriate column and row queries.

The column totals row 218 may include a total of counts of documents for each of the column queries of the columns 210-211 as well as a total for the base query 205. Likewise, the row totals column 212 may include a total for each of the row queries of the rows 215-217 as well as a total for the base query 205.

Although counts are shown in the cells of the data grid 200, the cells are not limited to displaying counts. For example, a cell may include a percentage that indicates a percentage of the base query total or a percentage of a total for a row or column of the query. An example of this is illustrated in FIG. 3.

Turning to FIG. 3, a data grid 300 may be obtained from a base query, column queries, and row queries. The base query limits the results to the latest versions. The column queries limit the results to certain categories. The row queries limit the results based on a size of a software application. The data cells of within the data grid 300 include percentages rather than counts.

The data grid 300 may be a partial representation of data returned in a data grid. For example, the data grid 300 does not show the row totals column although this column may be shown by scrolling one or more cells to the right.

Whether the cells of the data grid are displayed in counts or percentages may be configured via a user interface element (e.g., a drop down list, radio box, or the like) suitable to accept user input. Furthermore, whether the percentage is relative to the base query total, a total for a row, or a total for a column may also be configured via a user interface element.

In addition, a graphical element (e.g., a background bar or other element) may visually indicate a percentage for a cell. Each of the cells that show percentages may include a graphical element appropriate for the percentage. The graphical element may, for example, have a width, height, or other characteristic that may be used to visually indicate the percentage. Color or some other graphical indication may be used to indicate whether a percentage is a percentage of a base query total, a percentage of a column total, or a percentage of a row total. Numeric values may be combined. Statistic measures other than count or percentage may be displayed. A graphical indication may provide a visualization of some other data, such as a trend line over time, a scatter plot, or the like.

Figure 4:
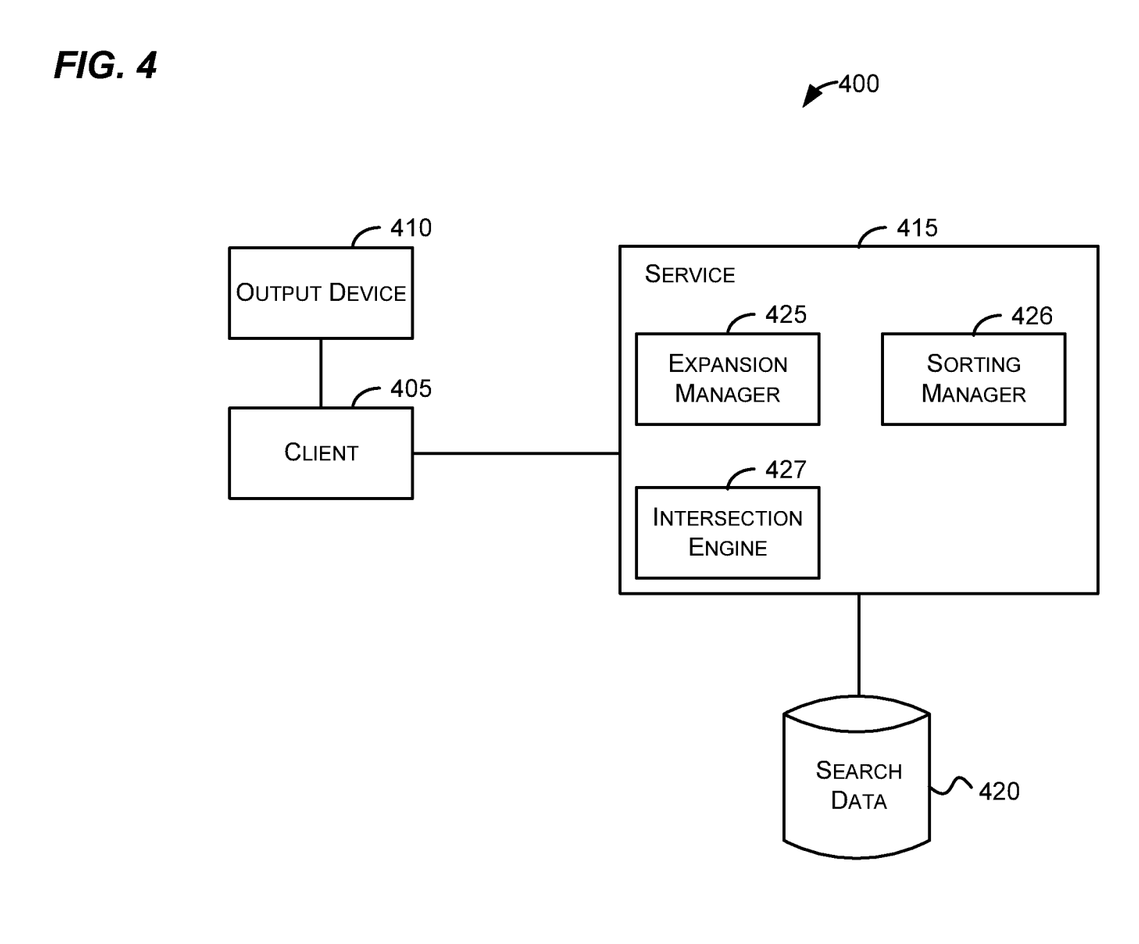
FIG. 4 is a block diagram that generally represents exemplary components of a system configured in accordance with aspects of the subject matter described herein.

FIG. 4 is a block diagram that generally represents exemplary components of a system configured in accordance with aspects of the subject matter described herein. The components illustrated in FIG. 4 are exemplary and are not meant to be all-inclusive of components that may be needed or included. Furthermore, the number of components may differ in other embodiments without departing from the spirit or scope of aspects of the subject matter described herein. In some embodiments, the components described in conjunction with FIG. 4 may be included in other components (shown or not shown) or placed in subcomponents without departing from the spirit or scope of aspects of the subject matter described herein. In some embodiments, the components and/or functions described in conjunction with FIG. 4 may be distributed across multiple devices.

As used herein, the term component is to be read to include hardware such as all or a portion of a device, a collection of one or more software modules or portions thereof, some combination of one or more software modules or portions thereof and one or more devices or portions thereof, or the like. In one implementation, a component may be implemented by configuring (e.g., programming) a processor (e.g., the processing unit 120 of FIG. 1) to perform one or more actions.

For example, the components illustrated in FIG. 2 may be implemented using one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

An exemplary device that may be configured to implement one or more of the components of FIG. 4 comprises the computer 110 of FIG. 1.

A component may also include or be represented by code. Code includes instructions that indicate actions a computer is to take. Code may also include information other than actions the computer is to take such as data, resources, variables, definitions, relationships, associations, and the like.

Code may be executed by a computer. When code is executed by a computer, this may be called a process. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. Code may execute in user mode, kernel mode, some other mode, a combination of the above, or the like. A service is another name for a process that may be executed on one or more computers.

Although the terms "client" and "service" are sometimes used herein, it is to be understood, that a client may be implemented on a machine that has hardware and/or software that is typically associated with a server and that likewise, a service may be implemented on a machine that has hardware and/or software that is typically associated with a desktop, personal, or mobile computer. In an embodiment, a client and service may be implemented on the same physical machine.

Furthermore, as used herein, each of the terms "service" and "client" may refer to one or more physical or virtual entities, one or more processes executing on one or more physical or virtual entities, and the like. Thus, a service may include an actual physical node upon which one or more processes execute, a virtual node upon which one or more processes execute, a group of nodes that work together, and the like. A service may include one or more processes executing on one or more physical or virtual entities. Furthermore, a single process may implement one or more services.

Turning to FIG. 4, the system 400 may include a client 405, an output device 410, a service 415, a data store 420, and may include other components (not shown).

The output device 410 may include any type of output device such as, for example, those output devices described in conjunction with FIG. 1.

The data store 420 may be implemented using any type of storage media capable of storing search data. For example, devices implementing the data store 420 may include volatile memory (e.g., a cache) and non-volatile memory (e.g., a persistent storage). The devices implementing the data store 420 may be external, internal, or include some components that are internal and some components that are external to the machines hosting other components of the system 200.

In one implementation, the data store 420 may be implemented as a device that generates search data rather than storing the search data. In this implementation, the data store 420 may determine searchable data regarding documents based on the content of the documents and/or metadata regarding the documents.

The service 415 may include various components that may be hosted on one or more machines. Some exemplary components include an expansion manager 425, a sorting manager 426, an intersection engine 427, and other components (not shown).

The expansion manager 425 may include logic for expanding terms included in a search request. For example, a search request may include a prefix followed by an indication that the prefix is to be expanded into queries that include terms that begin with the prefix. For example, a search request may include "cat:>". The expansion manager 425 may interpret this search request to expand to queries that include search terms in the search data that start with "cat:". Some examples of what may be included in the search data include "cat:education", "cat:entertainment", "cat:games", and the like. As another example, a search request may include "intern>". This search request may expand to queries that include search terms in the search data that start with "intern".

As another example, a search request may include an alias that is to be expanded into a set of one or more queries. An alias may include a string that has been defined to expand to queries that include other strings. For example, an alias, "education" may expand into "cat:education", "schools", and "United States".

As another example, a search request may include a regular expression that is to be evaluated to identify one or more queries. For example, a search request that includes "js2/d{3}/" may be expanded to queries that include search terms that start with js2 followed by 3 digits. This search request may be expanded, for example, into queries that involve "js2001", "js2002", "js2003", "js2005", "js2015", and so forth.

Regular expressions are not limited to digits and may include any other types of characters—alphanumeric or non-alphanumeric.

The sorting manager 426 may include logic to sort for expansions that return sortable terms. FIG. 3 shows one example of this where the size results are shown sorted from smallest to largest. This sorting may also be done on other expansions that return numeric terms including the "js2/d{3}/" example above as well as expansions that return non-numeric terms (e.g., expansions that return alphabet characters).

The intersection engine 427 may include logic to perform intersection operations on result sets returned from queries. For example, a result set returned from a base query may include a set of identifiers, a result set returned from a column query may include a different set of identifiers, and a result set returned from a row query may include yet a different set of identifiers. The intersection engine 427 may perform an intersection operation for each data cell of a data grid to determine the identifiers that are common for the base query, the row query, and the column query associated with the data cell.

In one implementation, after obtaining the result sets for the base query, the one or more column queries, and the one or more row queries, an intersection operation for each data cell may be performed using the already-obtained result sets and without any additional queries.

In another implementation, intersection operations may be performed by the service 415 by issuing a query for each data cell of a data grid. Each return result for an issued query may include results equivalent to intersecting the identifiers returned from the base query, an appropriate row query, and an appropriate column query.

After creating a data grid that includes cells with filled in values, the service 415 may send the entire data grid as a data structure to the client 405. Upon receipt of the data grid, the client 405 may manipulate the data grid (e.g., sort, re-order columns or rows, compute percentages, and so forth). The client 405 may also output the data grid to the output device. In some implementations, the sorting manager 426 may be implemented on the client 405.

The client 405 may provide a user interface that allows a user to quickly add, delete, or modify queries. For example, referring to FIG. 2, the client 405 may display the data grid 200 in a window and allow the user to add, delete, or update base, row, or column queries.

Figure 5:
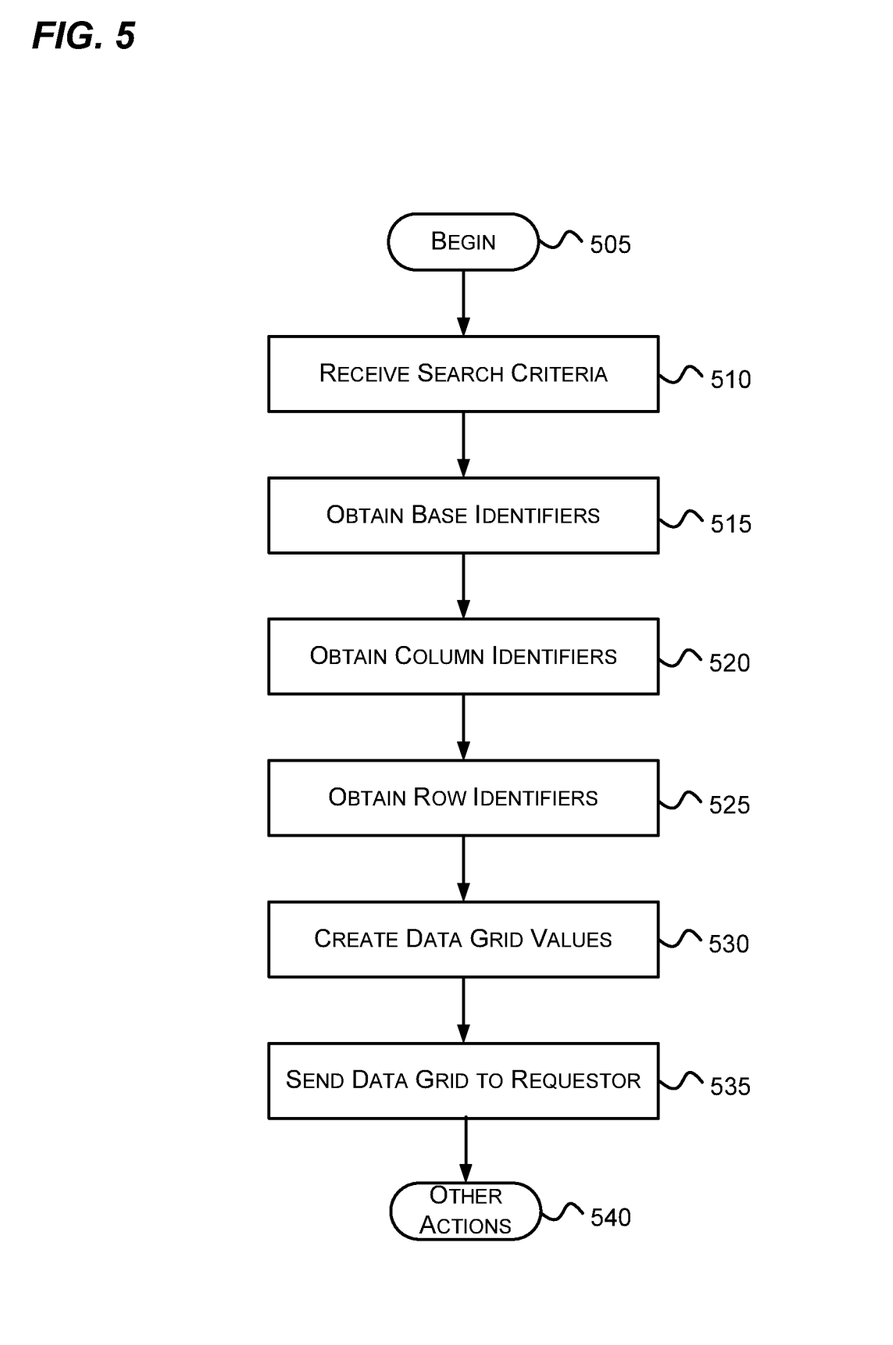
FIGS. 5-6 are flow diagrams that generally represent exemplary actions that may occur in accordance with aspects of the subject matter described herein.
Figure 6:
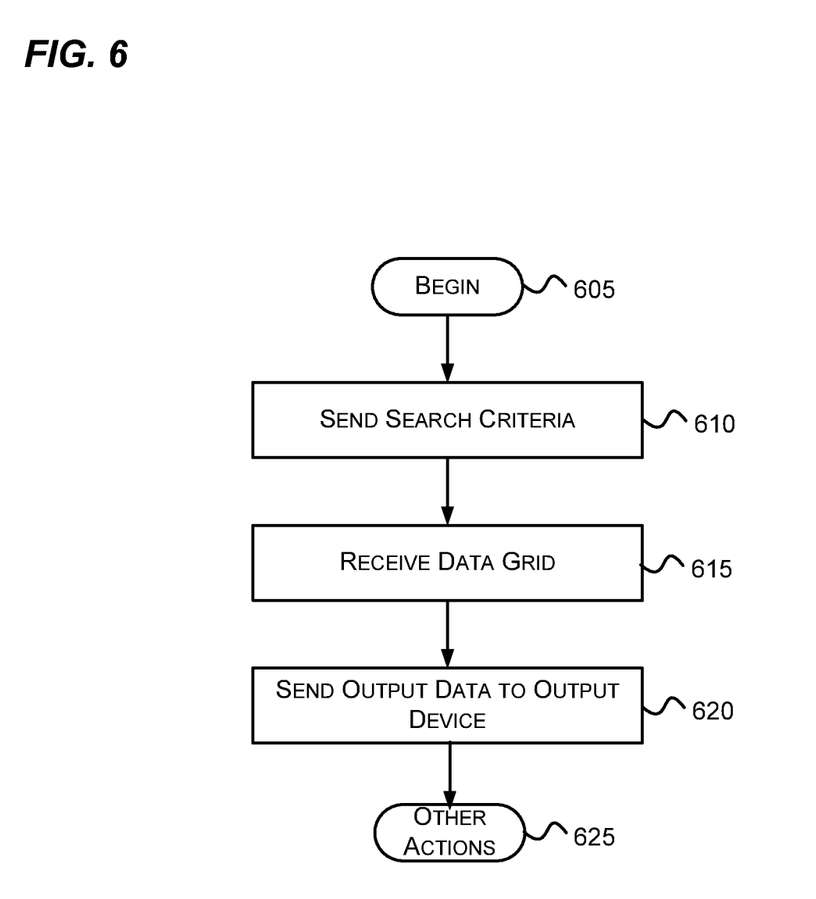

FIGS. 5-6 are flow diagrams that generally represent exemplary actions that may occur in accordance with aspects of the subject matter described herein. For simplicity of explanation, the methodology described in conjunction with FIGS. 5-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, two or more of the acts may occur in parallel or in another order. In other embodiments, one or more of the actions may occur with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 5 is a flow diagram that generally represents exemplary actions that may occur on a service in accordance with aspects of the subject matter described herein. Turning to FIG. 5, at block 505, the actions begin.

At block 510, search criteria are received. For example, referring to FIGS. 2 and 4, the service 415 may receive search criteria from the client 405. The query may identify a base query (e.g., "app:javascript"), a set of column queries (e.g., "cat:games" and "cat:tools"), and a set of row queries (e.g., "jQuery", "Dojo", and "JS2001").

At block 515, base identifiers are obtained that identify data items that satisfy the base query. For example, referring to FIG. 4, the service 415 may query the data store 420 to obtain identifiers of documents that satisfy the base query (e.g., "app:javascript").

At block 520, column identifiers are obtained that identify data items that satisfy the column queries. For example, referring to FIG. 4, the service 415 may query the data store 420 to obtain identifiers of documents that satisfy the two column queries (e.g., "cat:games" and "cat:tools"). The identifiers that satisfy one column query may be kept separate from or otherwise identified to belong to the one column query while the identifiers that satisfy the other column query may be kept separate from or otherwise identifier to belong to the other column query.

At block 525, row identifiers are obtained that identify data items that satisfy the row queries. For example, referring to FIG. 4, the service 415 may query the data store 420 to obtain identifiers of documents that satisfy the three row queries (e.g., "jQuery", "Dojo", and "JS2001").

At block 530, the data grid values are created. In one implementation, this may be performed by:

For each data cell of a data grid, performing an intersection operation on the base identifiers, a set of column identifiers that correspond to the data cell, and a set of row identifiers that correspond to the data cell to obtain a value for the data cell and placing the value for the data cell in the data grid.

For example, referring to FIG. 2, the cell at the intersection of the column 210 and the row 215 may be determined by intersecting the identifiers returned from the base query with the identifiers returned from the jQuery row query and the identifiers returned from the cat:games column query. The value obtained in this example is 100—meaning that the base query, the row query, and the column query have 100 identifiers in common. This intersection operation may be repeated, with appropriate column and row identifiers, for each data cell of FIG. 2.

At block 535, the data grid is sent to the requestor. For example, referring to FIG. 4, the service 415 sends the data grid it has created to the client 405.

At block 540, other actions, if any, may be performed. For example, other actions may include:

1. Evaluating regular expressions to identify one or more queries;
2. Expanding an alias to identify one or more queries;
3. Expanding a prefix to identify one or more queries;
4. Counting a number of identifiers that result from an intersection operation and placing the count in the data grid;
5. Counting a number of identifiers that result from an intersection operation and placing a percentage corresponding to the count in the data grid;
6. Determining total counts and placing the total counts in cells of the data grid; and
7. Intersecting identifiers from additional dimensions (e.g., dimensions beyond the column and row queries).

The other actions above are not intended to be all-inclusive or exhaustive of the actions that may occur. Other actions may also include, for example, any other actions described herein that occur on the service 415 of FIG. 4. Based on the teachings herein, those skilled in the art may recognize yet other actions that may occur on a service without departing from the spirit or scope of aspects of the subject matter described herein.

FIG. 6 is a flow diagram that generally represents exemplary actions that may occur on a client in accordance with aspects of the subject matter described herein. Turning to FIG. 6, at block 605, the actions begin.

At block 610, search criteria are sent to a service. For example, referring to FIGS. 2 and 4, the client 405 may send search criteria to the service 415. The query may identify a base query (e.g., "app:javascript"), a set of column queries (e.g., "cat:games" and "cat:tools"), and a set of row queries (e.g., "jQuery", "Dojo", and "JS2001").

At block 615, a data grid is received from the service. For example, referring to FIG. 2, a data structure that indicates the data found in the data grid 200 may be received from the service.

At block 620, output data is sent to an output device. For example, referring to FIGS. 2 and 4, output corresponding to the data grid 200 may be sent to the output device 410 (e.g., display, speakers, printer, braille output, other output device, or the like).

Sending output data to a display may include, for example:

1. Displaying, for a cell, a graphical element that indicates a percentage;
2. Assigning the graphical element a color that indicates whether the percentage is relative to a column, a row, or a total;
3. For each data cell of the data grid, displaying a count that indicates a number of data items satisfying the intersection operation for the data cell;
4. For each data cell of the data grid, displaying a percentage that indicates a percent of data items satisfying the intersection operation for the data cell; and
5. Other actions mentioned herein.

At block 625, other actions, if any, may be performed. Other actions may include, for example, sending additional search criteria to the service. The additional search criteria may indicate queries for one or more dimensions other than the one or more column queries and the one or more row queries.

In response to sending the additional search criteria to the service, additional dimension data may be received that indicates search data satisfying the additional search criteria. In response, additional output data corresponding to the additional dimension data may be provided to the output device, perhaps in response to user input (e.g., scrolling in the time dimension with a mouse wheel, entering other input, or the like).

The processing unit 120 of FIG. 1 may be configured through computer-executable instructions to perform the actions indicated above.

As can be seen from the foregoing detailed description, aspects have been described related to grid queries. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   from a requestor, receiving search criteria that indicates a base query, one or more column queries, and one or more row queries, at least one of the base query, the one or more column queries or the one or more row queries including an operation;
   obtaining base identifiers that identify data items that satisfy the base query;
   obtaining column identifiers that identify data items that satisfy the one or more column queries;
   obtaining row identifiers that identify data items that satisfy the one or more row queries;
   for each data cell of a data grid that has a column for each of the one or more column queries and a row for each of the one or more row queries, performing an intersection operation on the base identifiers, a set of column identifiers that correspond to the data cell, and a set of row identifiers that correspond to the data cell to obtain a value for the data cell and placing the value for the data cell in the data grid; and
   sending the data grid to the requestor.

2. The method of claim 1, wherein the operation is implicitly indicated.

3. The method of claim 1, wherein the operation is explicitly indicated.

4. The method of claim 1, wherein the data grid is sorted for expansions that return sortable terms.

5. The method of claim 1, further comprising evaluating a regular expression included in the search criteria to identify the one or more column queries or the one or more row queries.

6. The method of claim 1, further comprising identifying the one or more row queries or the one or more column queries by finding search terms that begin with a prefix provided in the search criteria.

7. The method of claim 1, further comprising identifying the one or more column queries or the one or more row queries by expanding an alias included in the search criteria.

8. The method of claim 1, further comprising counting a number of identifiers that result from the intersection operation and placing the count in the value.

9. The method of claim 1, further comprising counting a number of identifiers that result from the intersection operation and placing a percentage corresponding to the count in the value.

10. The method of claim 1, wherein the search criteria indicates queries for one or more dimensions other than the one or more column queries and the one or more row queries.

11. A computer storage medium having computer-executable instructions, which when executed perform actions, comprising:
    sending search criteria to a service, the search criteria indicating a base query, one or more column queries, and one or more row queries, at least one of the base query, the one or more column queries or the one or more row queries including an operation, the service structured to populate a data grid using the search criteria to obtain base identifiers that identify data items that satisfy the base query, column identifiers that identify data items that satisfy the one or more column queries, and row identifiers that identify data items that satisfy the one or more row queries and to fill in each data cell of the data grid by performing an intersection operation on the base identifiers, a set of column identifiers that correspond to the data cell, and a set of row identifiers that correspond to the data cell to obtain a value for the data cell;
    receiving the data grid from the service; and
    providing output data corresponding to the data grid on an output device.

12. The computer storage medium of claim 11, further comprising receiving user input that indicates a selected cell of the data grid and in response performing actions, comprising:

sending a request for extended data corresponding to the selected cell to the service, the extended data including details regarding data items obtained from the service by intersecting the base query identifiers, a set of column identifiers, and a set of row identifiers that correspond to the selected cell;

receiving the extended data corresponding to the selected cell from the service; and providing output data corresponding to the extended data on an output device.

13. The computer storage medium of claim 11, wherein the operation is implicitly indicated.

14. The computer storage medium of claim 11, wherein the operation is explicitly indicated.

15. The computer storage medium of claim 11, wherein the data grid is sorted for expansions that return sortable terms.

16. The computer storage medium of claim 11, wherein providing output data corresponding to the data grid on an output device comprises:

displaying, for a cell, a graphical element that indicates a percentage; and assigning the graphical element a color that indicates whether the percentage is relative to a column, a row, or a total.

17. In a computing environment, a system, comprising:
a memory structured to store search data; and
a processor coupled to the memory, the processor configured to perform actions, the actions comprising:
from a requestor, receiving search criteria that indicates a base query, one or more column queries, and one or more row queries, the one or more column queries or the one or more row queries including an operation, obtaining base identifiers that identify data items from the search data that satisfy the base query, obtaining column identifiers that identify data items from the search data that satisfy the one or more column queries, obtaining row identifiers that identify data items from the search data that satisfy the one or more row queries, for each data cell of a data grid that has a column for each of the one or more column queries and a row for each of the one or more row queries, performing an intersection operation on the base identifiers, a set of column identifiers that correspond to the data cell, and a set of row identifiers that correspond to the data cell to obtain a value for the data cell and placing the value for the data cell in the data grid, and sending the data grid to the requestor.

18. The system of claim 17, wherein the operation is implicitly indicated.

19. The system of claim 17, wherein the operation is explicitly indicated.

20. The system of claim 17, wherein the processor is further configured to perform additional actions, the additional actions comprising sorting for expansions that return sortable terms.

* * * * *